(12) United States Patent
Shah et al.

(10) Patent No.: US 11,100,409 B2
(45) Date of Patent: Aug. 24, 2021

(54) MACHINE LEARNING ASSISTED TRANSACTION COMPONENT SETTLEMENT

(71) Applicant: HIGHRADIUS CORPORATION, Houston, TX (US)

(72) Inventors: Vishal Shah, Kandivali (IN); Sonali Nanda, Miyapur (IN); Srinivasa Jami, Telangana (IN)

(73) Assignee: HighRadius Corporation, Houston, TX (US)

( * ) Notice: Subject to any disclaimer, the term of this patent is extended or adjusted under 35 U.S.C. 154(b) by 0 days.

(21) Appl. No.: 16/412,076

(22) Filed: May 14, 2019

(65) Prior Publication Data

US 2020/0265326 A1    Aug. 20, 2020

(30) Foreign Application Priority Data

Feb. 15, 2019    (IN) .............................. 201941006155

(51) Int. Cl.
G06N 5/02    (2006.01)
G06N 20/00    (2019.01)

(52) U.S. Cl.
CPC .............. *G06N 5/025* (2013.01); *G06N 20/00* (2019.01)

(58) Field of Classification Search
CPC ................................ G06N 5/025; G06N 20/00
See application file for complete search history.

(56) References Cited

U.S. PATENT DOCUMENTS

| | | | |
|---|---|---|---|
| 2007/0038564 A1* | 2/2007 | Leavitt .................. | G06Q 20/00 705/40 |
| 2018/0349776 A1* | 12/2018 | Raamadhurai ......... | G06N 5/025 |
| 2019/0279102 A1* | 9/2019 | Cataltepe ................ | G06N 3/04 |
| 2019/0311288 A1* | 10/2019 | Noma .................... | G06N 5/048 |

OTHER PUBLICATIONS

Hall, Mark Andrew. "Correlation-based feature selection for machine learning." (1999). (Year: 1999).*
Klinkenberg, Ralf. "Learning drifting concepts: Example selection vs. example weighting." Intelligent data analysis 8.3 (2004): 281-300. (Year: 2004).*

* cited by examiner

*Primary Examiner* — Li B. Zhen
*Assistant Examiner* — Markus A. Vasquez
(74) *Attorney, Agent, or Firm* — Adsero IP

(57) ABSTRACT

A system generates trade deduction settlement rules and associated confidence scores independent of buyer specifications. A machine learning equipped rewards based method performed by the system analyzes historically matched deductions and promotions to understand patterns. Penalties are applied to outdated rules, and recent trends are promoted through rewards. All available deduction-promotion combinations may be analyzed in batches for a given time period at each pair level within an artificial intelligence model of the method. A rules selector selects the most recurring patterns along those combinations based upon definable thresholds. The system finds hidden patterns to provide suggestions for trade deduction settlement. The system further captures the rules and evolves the rules over time.

20 Claims, 14 Drawing Sheets

CUSTOMER DATA GRID

| | tpm_fk_customer_map_id | tc_rf5 | tpm_rf2 | tpm_rf1 | tc_rf7 |
|---|---|---|---|---|---|
| ded_m5 | | | | 0.92<br>direct_mapping | |
| ded_m3 | 0.99<br>(is contains) | | | 0.95<br>is contains | 0.88<br>is contains |
| destination_customer_map_id | | 0.95<br>(direct mapping) | 0.88<br>direct_mapping | | |
| ded_m8 | | | | 0.99<br>direct_mapping | 0.99<br>direct_mapping |
| service_provider | 1<br>(direct mapping) | | | | |
| vendor_name | | | | 0.91<br>is contains | 1<br>is contains |
| ded_fk_customer_map_id | | | | | |

FIG. 5A

DATES GRID

| 500B | ship_end_date | ship_start_date |
|---|---|---|
| ded_rn1 | | 1<br>> 0 days |
| invoice_date | 0.96<br>< 15 days | 1<br>> 0 days |
| promotion_execution_from_date | 1<br>< 0 days | 0.92<br>> -10 days |
| promotion_execution_to_date | 0.98<br>< 20 days | 1<br>> 0 days |

FIG. 5B

IDENTIFIERS GRID

| | contract_numbers | tc_rf7 | tpm_rf2 | tc_rf5 | tpm_rf1 |
|---|---|---|---|---|---|
| ded rn5 | | | | 0.89 direct_mapping | |
| ded rn3 | | | 1 is contains | | |
| customer reason code | | | | | |
| ded rn8 | 0.9 direct_mapping | | 0.79 direct_mapping | | |
| deal id | | 0.98 is contains | | | |
| original dispute number | | | | | |

FIG. 5C

ITEMS LEVEL DATA GRID

| | product_hierarchy_id | per_unit_rate |
|---|---|---|
| item_hierarchies | 0.99<br>is_contains_id | |
| item_unit_cost_norm | | 0.97<br>is_contains_amount |

FIG. 5D

MACHINE LEARNING ASSISTED TRANSACTION COMPONENT SETTLEMENT

CROSS-REFERENCE TO RELATED APPLICATIONS

This application claims the benefit of Indian Appl. No. 201941006155, filed Feb. 15, 2019. This application is incorporated herein by reference in its entirety to the extent consistent with the present application.

BACKGROUND

Various transactions between two businesses may have multiple component entities that should be correlated and settled as a matching pair. For example, deductions are a part of an order to cash cycle, for instance, a business-to-business (B2B) order to cash cycle. Companies make short payments that are less than an invoice amount for various reasons including, but not limited to, promotions and discrepancies related to delivery, pricing, etc. The difference between the short payment and the invoice amount is referred to herein as a deduction. Deductions related to promotions are referred to herein as trade promotions. For proper processing, it may be desirable to match a first component (deduction) with a second component (promotion) for a given transaction. In the B2B world, sellers give buyers various promotional incentives. These promotional incentives include, for example, discounts for paying early, discounts for displaying a product on a particular shelf location, etc.

Trade deduction settlement is a process whereby deductions are matched to trade promotions in order to resolve the deductions and thereby generate a resolved deduction-promotion pair, also referred to herein as a resolution. Currently the process of trade deduction settlement is a heuristic rules-based process that requires much human intervention. For example, trade deduction settlement rules are manually created, making them error prone and time-intensive to establish. Moreover, the trade deduction settlement rules are static in nature, which may lead to outdated rules over time. Both of these shortcomings often lead to increased time spent by deductions analysts to resolve deductions.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which:

FIG. 5A is a block diagram illustrating an example customer data grid generated by implementing the example method illustrated in FIG. 4, wherein the customer data grid may be used in part to select trade deduction settlement rules based on confidence scores, according to one or more disclosed implementations;

FIG. 5B is a block diagram illustrating an example dates grid generated by implementing the example method illustrated in FIG. 4, wherein the dates grid may be used in part to select trade deduction settlement rules based on confidence scores, according to one or more disclosed implementations;

FIG. 5C is a block diagram illustrating an example identifiers grid generated by implementing the example method illustrated in FIG. 4, wherein the identifiers grid may be used in part to select trade deduction settlement rules based on confidence scores, according to one or more disclosed implementations;

FIG. 5D is a block diagram illustrating an example items level data grid generated by implementing the example method illustrated in FIG. 4, wherein the items level data grid may be used in part to select trade deduction settlement rules based on confidence scores, according to one or more disclosed implementations;

DETAILED DESCRIPTION

Figure 1A:
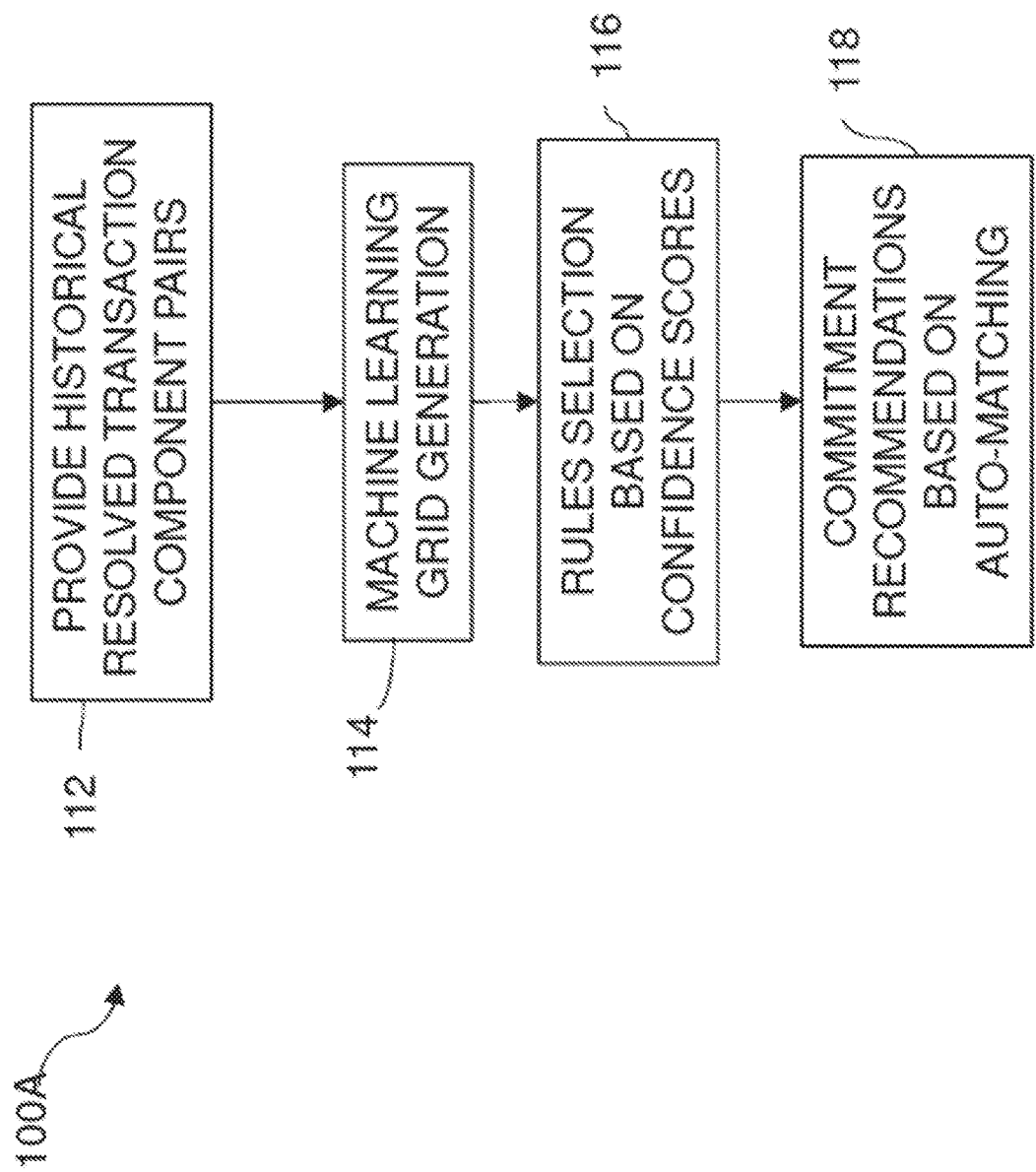
FIG. 1A is a process flow diagram illustrating an example method for machine learning assisted transaction component settlement, according to one or more disclosed implementations.

Examples of the subject matter claimed below will now be disclosed. In the interest of clarity, not all features of an actual implementation are described in this specification. It will be appreciated that in the development of any such actual example, numerous implementation-specific decisions may be made to achieve the developer's specific goals, such as compliance with system-related and business-related constraints, which may vary from one implementation to another. Moreover, it will be appreciated that such a development effort, even if complex and time-consuming, would be a routine undertaking for those of ordinary skill in the art having the benefit of this disclosure.

To address problems associated with the settlements of transaction components, systems and methods disclosed herein utilize artificial intelligence (AI)-based machine learning to automatically identify transaction settlement rules by determining trends or patterns in historical resolved transaction component pairs. The transaction settlement rules generated using machine learning, according to one or more methods of the present disclosure, are referred to herein as auto-generated rules. All or part of these auto-generated rules can be used to automate the matching of one transaction component to another transaction component.

In one example, to address problems associated with the trade deduction settlement process, systems and methods disclosed herein utilize artificial intelligence (AI)-based machine learning to automatically identify trade deduction settlements rules by determining trends or patterns in historical resolved deduction-promotion pairs. The trade deduction settlement rules generated using machine learning, according to one or more methods of the present disclosure, are referred to herein as auto-generated rules. All or part of these auto-generated rules can be used to automate the matching of deductions to possible promotions, also referred to herein as commitments. The auto-generated rules that are used in the automated matching or auto-matching process are referred to herein as auto-matching rules.

When a new deduction is compared against current promotions based on the auto-matching rules, a confidence score is generated. Some deductions may be automatically resolved to a particular promotion where the confidence score associated with that promotion meets a specified threshold. Other deductions may be presented to a deductions analyst with recommendations for possible matching promotions based on the promotions having the highest associated confidence scores. Other deductions may be matched against multiple promotions, which may be presented to a deductions analyst for final resolutions. An example benefit is higher auto-matching rates because the rules are determined by analyzing complex underlying patterns that can be easily overlooked in a manual rules generation process. Another example benefit is narrower and more accurate recommendations for deductions that are not auto-matched, which can, for instance, enable higher productivity of deductions analysts during the trade deduction settlement process.

Some businesses may purchase goods for resale from a manufacturer, while others may purchase raw materials that are made into goods for sale to consumers or other businesses. A business may have several methods they use to ensure that goods can be sold quickly, and that payment is received for the goods that are sold. A common pattern in a B2B transaction can be observed where one party plays the role of the buyer and one party plays the role of the seller. In this context, the buyer role is seeking to receive goods or services from the seller in exchange for payment. The seller role is the provider of services or the holder of goods the seller is willing to give to a buyer in exchange for payment. In some cases, the buyer may present payment in advance or at the time when the seller delivers the goods or services. In other cases, the seller may deliver the goods or services and issue an invoice to the buyer for later payment. While the buyer often pays the invoiced amount, there are times when the buyer may deduct all or a portion of the invoiced amount. In this context, a deduction for any portion of the invoiced amount may mean the buyer has taken advantage of a promotion offered by the seller with regards to the invoiced amount. The buyer may then pay the seller an amount that is less than the complete invoiced amount and claim the deduction by submitting data, such as a claim document, to the seller with regards to the deduction claim, also referred to herein simply as a deduction.

A buyer paying for an invoice by deducting an amount from the total invoiced amount may create a situation referred to as a "short payment". A buyer may make a short payment if, for example, the buyer feels they qualify for a promotional discount, or for some other reason. A seller may be impacted when a buyer issues a short payment on an invoice. The seller may not agree with the buyer's claimed deduction and may need to come to an agreement with the buyer to collect the remaining invoice balance. In some cases, the seller may agree with the buyer's claimed deduction and resolve the deduction to a particular promotion.

In traditional systems, all the deductions data, e.g., from deduction claim documents, may be aggregated into a deductions database. Similarly, all the promotions data from multiple promotions across multiple buyers and buyer entities (e.g., business units) may be aggregated into a promotions database. However, there has not been much uniformity between the formatting of the deductions data and the promotions data within the respective deductions and promotions databases. For instance, the deductions database may have at least tens of columns each having at least tens of data categories, with each column representing a different deduction. Similarly, the seller may have offered multiple promotions to this particular buyer as well as to other buyers. Therefore, the promotions database may also have tens of columns each having at least tens of data categories, with each column representing a different promotion, for example each having a different promotion ID. To complicate trade deduction settlement even more, oftentimes data categories between the deductions database and the promotions database may have different names but refer to the same type of data. For example, a contract number in a deductions database may be equivalent to a deal ID in the promotions database.

At least in part, due to the above complexities, much time is spent manually comparing columns in a deductions database with columns in the promotions database to try to match the deductions to the promotions. Some of the time may be spent corresponding with other departments such as the sales and/or marking department to better understand the promotions. Where resolutions result, rules can be manually created for future matching. However, due to the sheer volume of the data in the deductions and promotions databases, some relationships in the data may be overlooked. Additionally, many buyers may change the formatting of their deduction claims over time, but the trade settlement rules typically remain static and, thereby, do not reflect those changes. This results in additional manual labor for resolving deductions.

The use of the "short payment" by a buyer to result in a deduction claim is intended only as a non-limiting example of how a deduction claim may be established between a buyer and a seller. Another example of a deduction claim may be created when the buyer pays the full outstanding invoice balance and later disputes a portion of that payment by requesting the seller make a deduction. In this situation, if the seller later determines that the deduction claim is valid, the seller may issue a credit to the buyer's account. Alternatively, the seller may send the buyer a refund in the amount of the requested deduction. There are a number of ways in which a buyer and a seller may handle actual monetary resolution of deductions.

Having an understanding of the above overview, this disclosure will now explain a general example implementation and a non-limiting but detailed example implementation. Reference is now made to the drawings beginning with FIG. 1A. FIG. 1A depicts a process flow diagram illustrating an example method 100A for AI-based machine learning assisted transaction component settlement, according to one or more disclosed implementations. In the example method 100A, historical resolved transaction component pairs are provided (112) for generating (114) one or more grids. A grid, as referred to herein, is any structure created for comparing one set of data (e.g., for one transaction component) having multiple parameters to another set of data (e.g., for a second transaction component) having multiple parameters. A set, as used herein, means one or more.

A set of one or more transaction settlement rules may be selected (116) using the grid, wherein the selected set of rules enables matching a new transaction component to one or more other transaction components. For example, the rules for a given coupon may be derived from the most recurring one or more patterns across resolved item-coupon pairs based upon confidence scores generated during the grid analysis for that particular coupon. In another example, an auto-generated transaction settlement rule may correlate to multiple coupons, which may lead to multiple possible matches being presented for final resolution by a sales clerk during a point-of-sale purchase. Thus, the present disclosure may also be applied in a business to consumer (B2C) context.

Commitment recommendations (118) may be made based on auto-matching. In one example, whenever a new item is presented for purchase, the example method 100A in block 118 attempts to match the item to one or more current coupons. The matching is based on the auto-generated rules from block 116 for or across each of the coupons, and the matching generates a confidence score. For some items, the block 118 may automatically resolve the item to a particular coupon where the confidence score associated with that coupon meets a specified threshold. In another example, the item may be matched when all relationships of an auto-matching rule are satisfied. In another example, an item may be automatically resolved only when the item and/or coupon amount is also less than a specified threshold amount in order to, for instance, further decrease the risk of exposure to a seller. Automatically resolving coupons leaves fewer recommendations that may be presented to a sales clerk for final resolution. For items where confidence scores do not meet the specified thresholds for automatically resolving, recommendations for one or more possible coupon matches may be presented to the sales clerk.

Figure 1B:
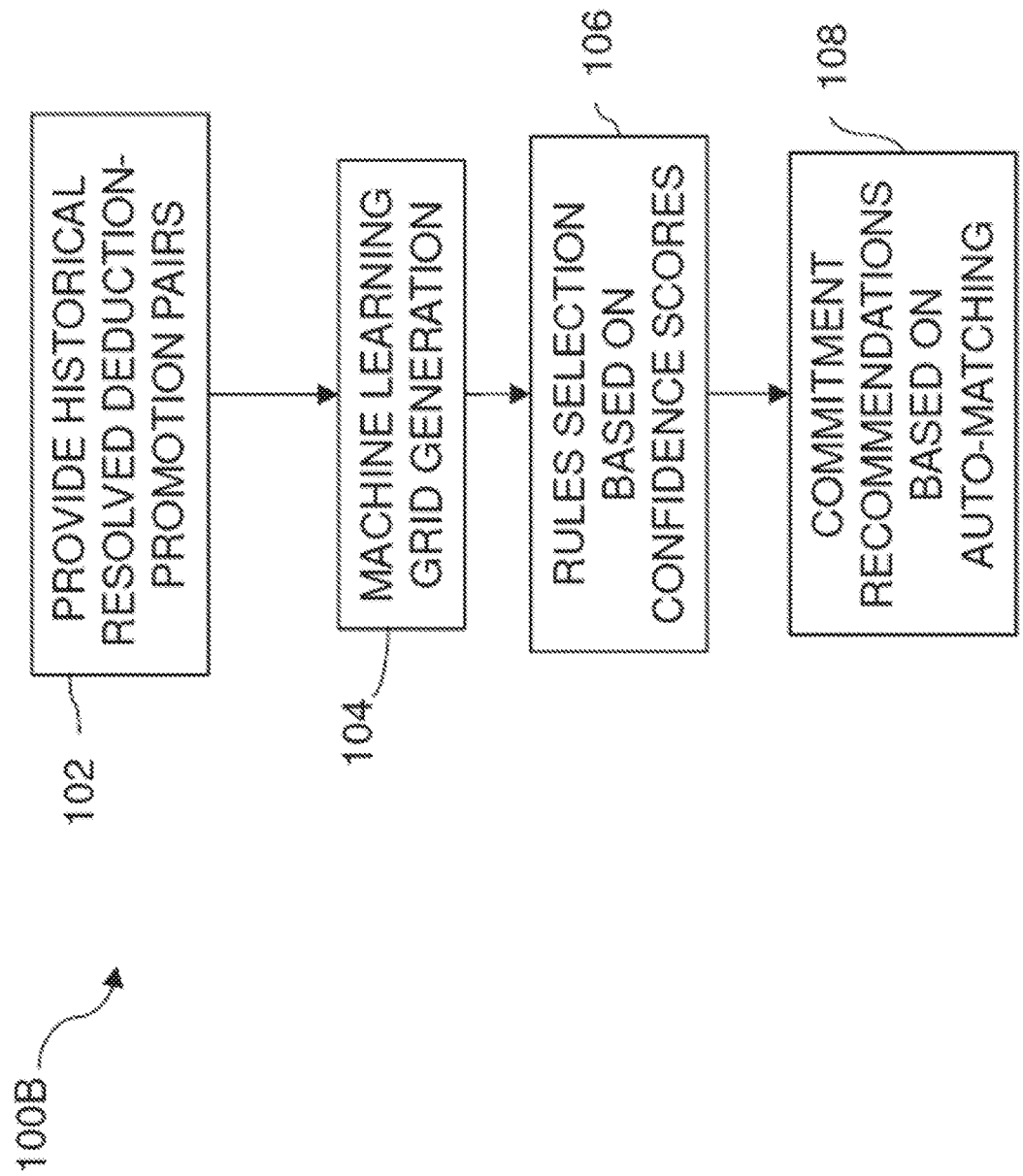
FIG. 1B is a process flow diagram illustrating an example method for machine learning assisted trade deduction settlement, according to one or more disclosed implementations.

Referring now to FIG. 1B, this disclosure will now explain a non-limiting but detailed example implementation. In this example, one transaction component is a deduction, and the other transaction component is a promotion. However, it should be understood that the description with respect to the remaining FIGS. 1B-10 are equally applicable to FIG. 1A as applied to other example implementations of matching a first transaction component to a second transaction component, for example matching a coupon with a item to be purchased.

FIG. 1B depicts a process flow diagram illustrating an example method 100B for AI-based machine learning assisted trade deduction settlement, according to one or more disclosed implementations. In the example method 100B, historical resolved deduction-promotion pairs are provided (102) for generating (104) one or more grids. A grid, as referred to herein, is any structure created for comparing one set of data having multiple parameters (e.g., deduction data) to another set of data having multiple parameters (e.g., promotion data).

For instance, a left-most column of the grid contains deduction data and a top-most row of the grid contains promotion data, for a resolved deduction-promotion pair. Accordingly, in the different cells of the grid, comparisons may be made between different pieces or categories of the deduction data and different pieces or categories of the promotion data to determine trends or patterns in the data. In one example, the resolved deduction-promotion pairs may be for the same buyer, for instance, from one or more entities (e.g., business units) of the same buyer. Moreover, the resolved deduction-promotion pairs may be for the same promotion over multiple deductions. Additionally, the resolved deduction-promotion pairs may be from a specified time period in order to increase accuracy of trade deduction settlement rules auto-generated using the example method 100B. The time period may be a number of months or a number of years. In another example, the method 100B may be implemented per buyer, when there are different buyers, in order to auto-generate buyer-specific trade deduction settlement rules.

In a particular example, the grid generation (104) employs a rewards-based machine learning model that may be used to analyze each of multiple resolved deduction-promotion pairs to detect one or more patterns across all the pairs. Patterns are promoted through rewards, for instance by applying a greater weighting to the pattern. A set of one or more trade deduction settlement rules may be selected (106) using the grid, wherein the selected set of rules enables matching new deductions to one or more promotions. For example, the rules for a given promotion may be derived from the most recurring patterns across the resolved deduction-promotion pairs based upon confidence scores generated during the grid analysis for that particular promotion. In another example, an auto-generated trade deduction settlement rule may correlate to multiple promotions, which may lead to multiple possible matches being presented for final resolution by the deductions analyst.

Commitment recommendations (108) may be made based on auto-matching. In one example, whenever a new deduction is received, the example method 100B in block 108 attempts to match the deduction to one or more current promotions. The matching is based on the auto-generated rules from block 106 for or across each of the promotions, and the matching generates a confidence score. For some deductions, the block 108 may automatically resolve the deduction to a particular promotion where the confidence score associated with that promotion meets a specified threshold. In another example, the deduction may be matched when all relationships of an auto-matching rule are satisfied. In another example, a deduction may be automatically resolved only when the deduction amount is also less than a specified threshold amount in order to, for instance, further decrease the risk of exposure to a seller. Automatically resolving deductions leaves fewer deductions that may be passed on to a deductions analyst for final resolution.

For deductions where confidence scores do not meet the specified thresholds for automatically resolving, recommendations for one or more possible promotion matches may be presented to the deductions analyst. The recommendations for possible matches may correlate to, for example, the promotions having corresponding rules that generated the highest confidence scores in block 106 and/or whether the confidence scores fall within a specified range of the thresholds. However, even in these cases, the example method 100B may narrow the possible promotional matches in a manner that could not have been done absent methods and systems according to the present disclosure. This leaves fewer deductions for a deductions analyst to manually resolve. The combination of automated matching and narrowed matching choices can enable the deductions analyst to process a greater number of deductions in the same given time.

A confidence score, as referred to herein, is a parameter or value produced during the process of auto-generating trade deduction settlements. For example, in the context of auto-generating trade deduction settlement rules, the confidence score may be a value generated in a cell of a grid, which may be compared against a specified threshold to determine whether a relationship exists to include in an auto-generated trade deductions settlement rule. In the context of auto-matching, these confidence scores may reflect how well a new deduction matches a given promotion when all relationships of an auto-matching rule are satisfied.

Figure 2:
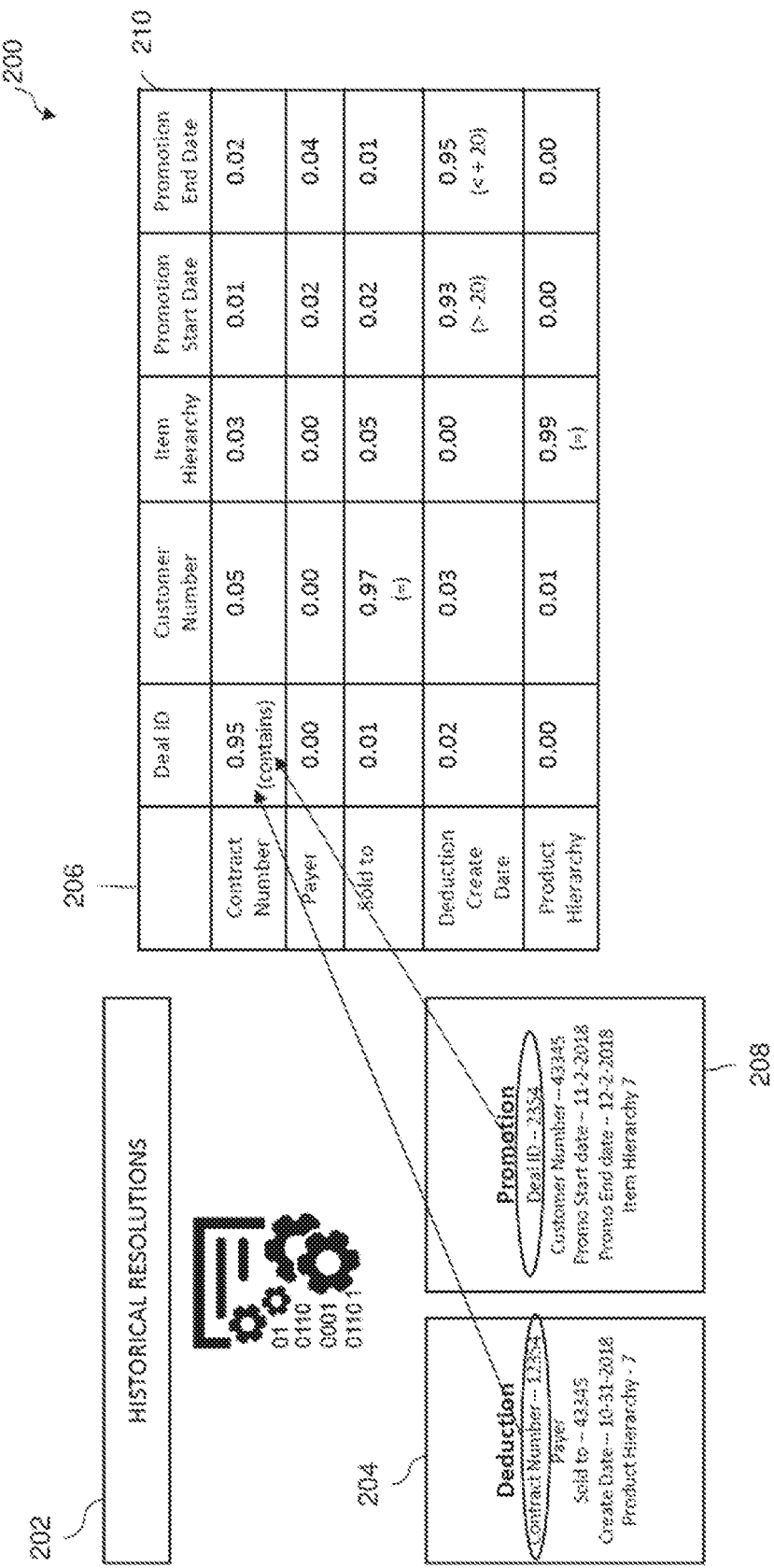
FIG. 2 is a block diagram illustrating an example grid generated by implementing the example method illustrated in FIG. 1B, wherein the grid may be used to select trade deduction settlement rules based on confidence scores, according to one or more disclosed implementations.

Referring now to FIG. 2, illustrated therein is an example grid 200 generated by implementing the example method 100B illustrated in FIG. 1B, wherein the grid 200 may be used to select trade deduction settlement rules based on confidence scores, according to one or more disclosed implementations. In an example, a historical resolutions database 202 contains historical resolved deduction-promotion pairs or resolutions. To generate the grid 200, for instance in block 104, a resolved deduction 204-promotion 208 pair is selected from the historical resolutions database 202. Values, also referred to herein as data points, from the deduction 204, in this case contract number, payer, sold to, create date, and product hierarchy categories may be populated into column 206 of the grid 200. Values or data points from the promotion 208, in this case deal ID, customer number, promotion start date, promotion end date, and item hierarchy may be populated into row 210 of the grid 200. It should be noted that in the example grid 200, there are only six columns and six rows shown. However, there may be many more columns and rows, e.g., over one hundred, depending on the number of data categories in the historical resolutions database 202 and in the corresponding deductions and promotions databases from which the historical resolutions database 202 is derived.

Once the deduction and promotion values are populated in the grid 200, an analysis may be performed in each cell of the grid 200 to determine whether there is a relationship between the corresponding deduction value and promotion value pair for that cell, also referred to herein as a deduction-promotion value pair. A value pair is also referred to herein as a data point pair. The relationship may be determined based on whether the deduction-promotion value pair satisfies one or more functions of that cell. Example functions may include, equal to, greater than, less than, close, contains (either as a sub-stream or a whole stream), a mapping (wherein the values or data points are not exactly equal but have a defined relationship), etc.

One example analysis may be to try all functions for every cell across all the resolved deduction-promotion pairs. However, a more resource efficient analysis is a rewards-based analysis. In one example, each function in the cell is given an equal weightage at the start of the grid analysis. For instance, where there are ten functions in a cell, each may be given a weight of 10% at the beginning of the grid analysis. During at least a first iteration of populating the grid 200 and performing an analysis based on the functions in each cell, a function is initially randomly selected. For instance, in the cell where the deduction contract number is compared with the promotion deal ID, a greater than function may be selected. When that function fails to match, another function is selected until a function that is satisfied is found or no satisfied function is found, wherein the analysis proceeds to another cell.

However, when a function is satisfied, the weightage of that function may be increased and the weightage of the other functions in the cell decreased. In the earlier example, all of the functions started with a weightage of 10%. After the first iteration, the weightage of the satisfied function may be increased to 10.1% and the weightage of the remaining nine functions reduced to 9.9%. In one example, the population of the grid 200 and function analysis may be performed over multiple iterations each time for a different resolved deduction-promotion pair. In a particular example, the multiple iterations are for the same promotions but for different deductions. In this manner, for each iteration that a particular function is properly satisfied, the weightage of that function increases, and the weightage of the other functions of the cell decrease. Accordingly, over time, the functions of some cells may reflect a distribution of weightages based on how many times they were satisfied.

In a particular example, to further optimize the method 100B, at some iteration after the first iteration of population of the grid 200 and function analysis, the first function of a cell that is selected for analysis is the function having the highest weightage. Accordingly, as it is more likely the function with the highest weightage will continue to be satisfied for subsequent iterations, analysis of the additional functions of many cells may be avoided over time. This leads to greater computer processing efficiency.

When all of the iterations have processed, for instance for a given promotion, grid 200 will indicate which functions have been consistently satisfied over the iterations. This, in turn, indicates the trend or pattern of the resolved deductions-promotions pairs. From this pattern, rules for a given promotion can be generated. Looking at the values reflected in the grid 200, the highest numbers in the grid 200 may reflect the trends or relationships between deduction-promotion category pairs for the resolutions for the given promotion. Whereas, the smaller numbers indicate no such relationship between the deduction-promotion category pairs. As illustrated, there are relationships between contract number and deal ID category pairs (as indicated by a confidence score of 0.95 for the function "contains"), sold to and customer number category pairs (as indicated by a confidence score of 0.97 for the function "equal"), deduction create data and promotions start date category pairs (as indicated by a confidence score of 0.93 for the function ">−20 days"), deduction create data and promotions end date category pairs (as indicated by a confidence score of 0.95 for the function "<+20 days"), and product hierarchy and item hierarchy category pairs (as indicated by a confidence score of 0.99 for the function "equal"). In one example, confidence scores above 0.90 may cause a deduction-promotion category pair and the corresponding satisfied function of a cell to be incorporated as a relationship for auto-generating a trade deduction settlement rule for matching a deduction to a promotion.

Accordingly, a trade deduction settlement rule can be auto-generated from the grid 200 for this promotion that says for a new deduction, when the contract number contains the deal ID, and the sold to matches the customer number, and the product hierarchy matches the item hierarchy, and the deduction create date is within twenty days of the promotion start date and promotion end date for a deduction, the deduction can be considered to match with a high enough level of confidence to recommend the promotion as a match to the deduction.

Figure 3:
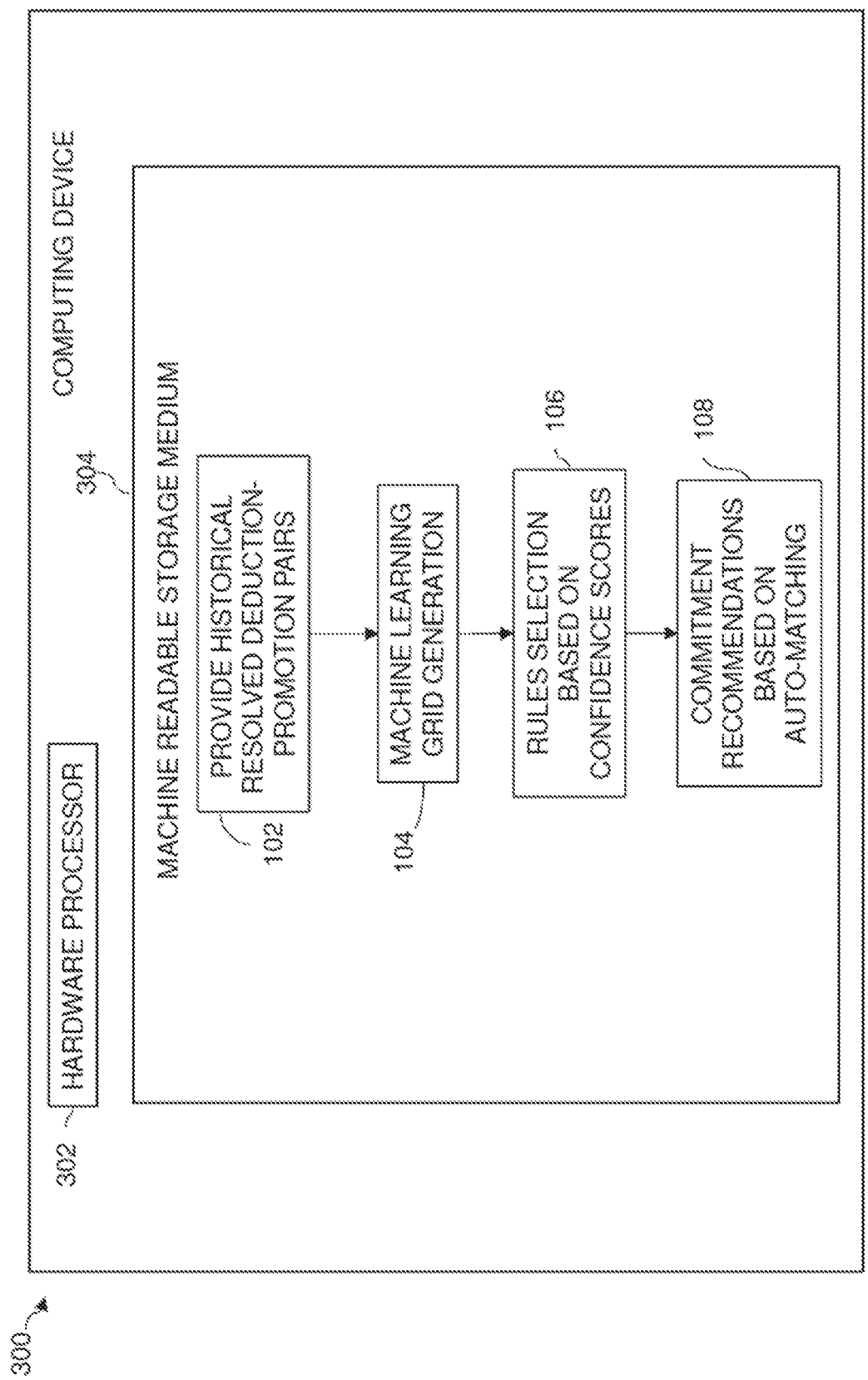
FIG. 3 is an example computing device with a hardware processor and accessible machine-readable instructions that may be used to compile and execute the example method of FIG. 1B, according to one or more disclosed implementations.

Referring now to FIG. 3, shown is an example computing device 300, with a hardware processor 302, and accessible machine-readable instructions stored on a machine-readable medium 304 that may be used to execute the example method 100B, according to one or more disclosed example implementations. However, computing device 300 may also be configured to perform the flow of other methods, techniques, functions, or processes described in this disclosure. In this example of FIG. 3, machine-readable storage medium 304 includes instructions to cause hardware processor 302 to perform blocks 102-108 discussed above with reference to FIG. 1B.

A machine-readable storage medium, such as 304 of FIG. 3, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 4:
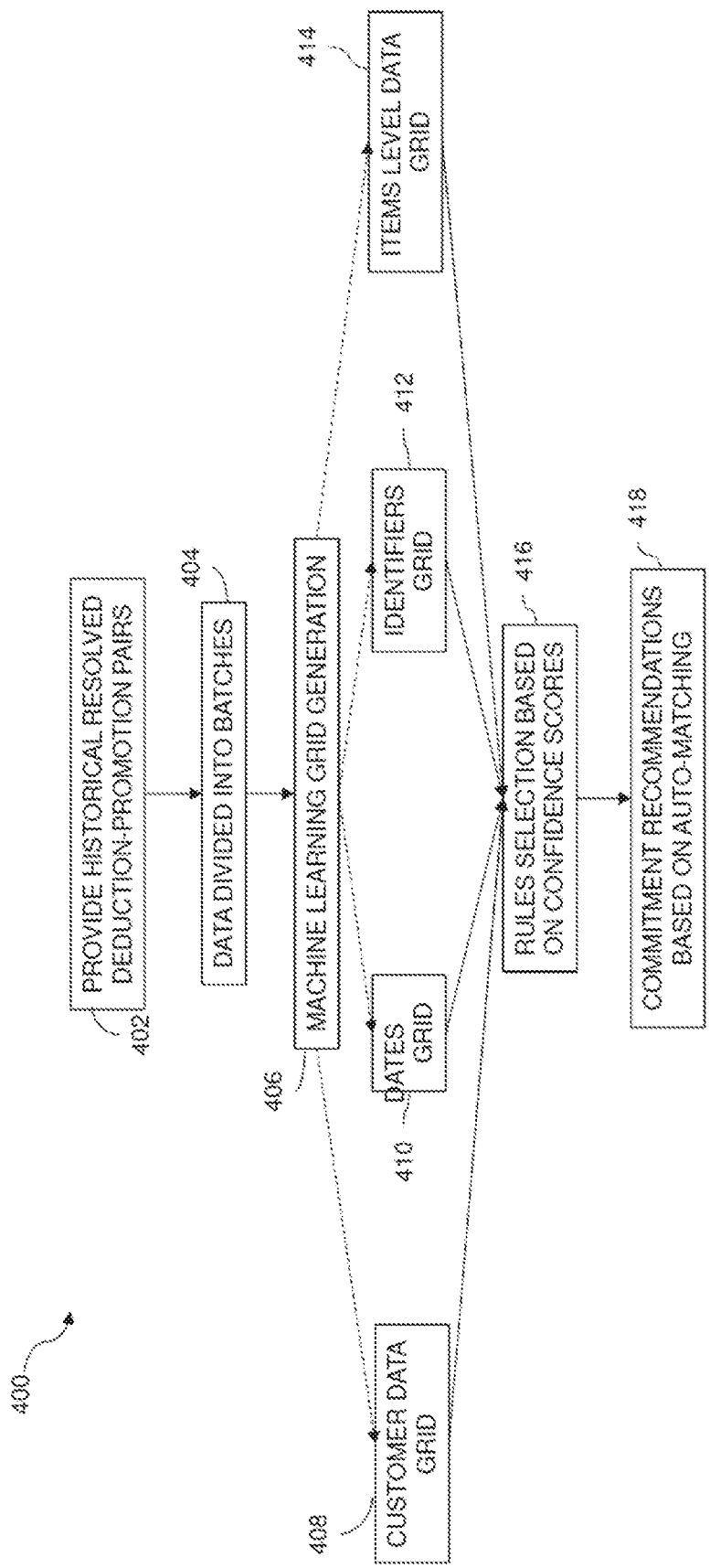
FIG. 4 is a process flow diagram illustrating another example method for machine learning assisted trade deduction settlement, according to one or more disclosed implementations.

FIG. 4 is a process flow diagram illustrating an example method 400 for machine learning assisted trade deduction settlement, according to one or more disclosed implementations, which enables further optimizations. In accordance with the example method 400, historical resolved deduction-promotion pairs can be provided (402). In one example, the resolved pairs may span a specified time period, for instance two years. However, the time period may be more or less. The data from the resolved deduction-promotion pairs may be divided (404) into batches based on one or more criterion. For example, the batches may be divided based on promotion, where each batch correlates to a different promotion. However, each of those promotion batches may be further divided based on a specified time frame, such as a number of days. The data may then be processed per resolved deduction-promotion pair to generate (406), in this case, multiple grids 408, 410, 412, 414, which are provided for rules selection (416) based on confidence score. The auto-generated rules from block 416 may be applied to new deductions in block 418 to generate commitment recommendations. The commitment recommendations may include automatically resolving some deductions to matched promotions when all relationships of an auto-matching rule are met and the confidence score related to the auto-matching rule exceeds a threshold, for instance 0.99. The commitment recommendations may include proposing possible matching promotions for other deductions when confidence scores generated for the auto-matching fail to meet corresponding thresholds or when some but not all of the relationships within an auto-matched trade deduction settlement rule are satisfied.

In this example, the grid 408 contains customer-related data. The grid 410 contains dates-related data. The grid 412 contains identifiers-related data. The grid 414 contains item level-related data, such as product- or service-related data. However, it should be realized that in other examples, the data in the multiple grids may be grouped based on different criteria that may depend, at least in part, on the categories of data in the historical resolved deduction-promotion pairs. Additionally, more or fewer than four such grids may be generated.

Referring now to FIG. 5A, shown is a block diagram illustrating an example customer data grid 408 generated by implementing the example method 400 illustrated in FIG. 4, wherein the customer data grid 408 may be used in part to select trade deduction settlement rules based on confidence scores, according to one or more disclosed implementations. Within customer data grid 408, the deduction data is populated in a column 502A, and the promotions data is populated in a row 500A. Illustrative categories of deduction and promotion customer data are shown. However, more or fewer categories may be included in the customer data grid 408. Additionally, different categories may be included in the customer data grid 408. The customer data grid 408 indicates, for example, final confidence scores generated after processing all of the deduction-promotion pairs, from which trade deduction settlement rules can be generated.

Referring now to FIG. 5B, shown is a block diagram illustrating an example dates grid 410 generated by implementing the example method 400 illustrated in FIG. 4, wherein the dates grid 410 may be used in part to select trade deduction settlement rules based on confidence scores, according to one or more disclosed implementations. Within dates grid 410, the deduction data is populated in a column 502B, and the promotions data is populated in a row 500B. Illustrative categories of deduction and promotion dates data are shown. However, more or fewer categories may be included in the dates grid 410. Additionally, different categories may be included in the dates grid 410. The dates grid 410 indicates, for example, final confidence scores generated after processing all of the deduction-promotion pairs, from which trade deduction settlement rules can be generated.

Referring now to FIG. 5C, shown is a block diagram illustrating an example identifiers grid 412 generated by implementing the example method 400 illustrated in FIG. 4, wherein the identifiers grid 412 may be used in part to select trade deduction settlement rules based on confidence scores, according to one or more disclosed implementations. Within identifiers grid 412, the deduction data is populated in a column 502C, and the promotions data is populated in a row 500C. Illustrative categories of deduction and promotion identifier data are shown. However, more or fewer categories may be included in the identifiers grid 412. Additionally, different categories may be included in the identifiers grid 412. The identifiers grid 412 indicates, for example, final confidence scores generated after processing all of the deduction-promotion pairs, from which trade deduction settlement rules can be generated.

Referring now to FIG. 5D, shown is a block diagram illustrating an example items level data grid 414 generated by implementing the example method 400 illustrated in FIG. 4, wherein the items level data grid 414 may be used in part to select trade deduction settlement rules based on confidence scores, according to one or more disclosed implementations. Within items level data grid 414, the deduction data is populated in a column 502D, and the promotions data is populated in a row 500D. Illustrative categories of deduction and promotion items level data are shown. However, more or fewer categories may be included in the items level data grid 414. Additionally, different categories may be included in the items level data grid 414. The items level data grid 414 indicates, for example, final confidence scores generated after processing all of the deduction-promotion pairs, from which trade deduction settlement rules can be generated.

Returning now to FIG. 4, in a particular example, the last two years of resolutions data, which has all the historically resolved deduction-promotions pairs, is provided at block 402. The data may be divided (404) into batches of fifteen days. For instance, for resolutions data from January 2017 to December 2019, data from Jan. 1, 2017 to Jan. 15, 2017 may be batch one. Data from Jan. 16, 2017 to Jan. 31, 2017, may be batch two, and so on. Then, all the columns from the deduction data and promotion data may be broken into four groups to generate (406) the four grids 408, 410, 412, 414 using the machine learning model. The customer data grid 408 may include categories such as payer, ship to, who paid the bills, who ordered, who is the vendor, all the buyer entities, etc. The dates grid 410 may include categories such as promotion start date, promotion end date, invoice date, ship date, deduction created date, etc. The identifiers grid 412 may include categories such as deal ID, invoice number, billing document number, reference number, any other data having a transactional ID, etc. The items level data grid 414 may include categories such as stock keeping unit (SKU), material ID, etc. Distributing the deduction data and promotion data across multiple grids leverages relatedness of different categories, so that only categories that have some likelihood of ever matching may be placed in a grid together. This further optimizes computer processing resources by minimizing analyses between unrelated categories of data.

Continuing with this example, the first batch of fifteen days is passed to all the four grids 408, 410, 412, 414. In one particular example the first batch contains 1,000 resolutions, and one resolution at a time is sent across all the four grids 408, 410, 412, 414. A machine learning process may be performed in each of the grids 408, 410, 412, 414 similar to the rewards-based machine learning process performed by reference to grid 200 of FIG. 2 to select or generate trade deduction settlement rules. The second batch of fifteen days is then passed through the grids 408, 410, 412, 414 one resolution at a time. Grid results of the first batch may be averaged with grid results of the second batch.

In one particular example, the average is a weighted average with the grid results of the second (later in time) batch having a higher weighting (e.g., 100%) in the average than the first (earlier in time) batch (e.g., 70%). As the batches continue to be processed, older batches continue to get a lower weightage, whereas newer batches continue to get a higher weightage in a running weighted average. In another example, the method 400 is run every specified number of days, for instance, every fifteen days, and a new running weighted average is generated that includes the grid results based on the new resolutions data. The new resolutions data gets a higher weightage than the older resolutions data. In this manner, the existing rules may be continuously updated with new resolved deduction-promotion pairs.

Implementing the weighted average may also enable the machine learning process to take into account relationships between the deduction data and promotion data changing over time. Such a change may occur, for example, due to a buyer changing the format of the deduction claims, due to the buyer changing the naming of the categories, due to changes in promotions, etc. If relationships between the deduction and promotion data change over time, the above described or a similar weighted average between older and newer batches allows the resulting trade deduction settlement rules to be correspondingly updated over time. This addresses the problem of static trade deduction settlement rules. Accordingly, if a relationship stops presenting in a cell as a pattern, the rule related to or that included that relationship will become inactive, for instance based on a decrease in the confidence score related to that relationship. Similarly, if a new relationship is established as a pattern in a grid, a rule related to or including that relationship will become active, for instance based on an increase in the confidence score related to that relationship.

In another example, at the end of processing a batch, some kind of trimming is performed. For example, if some weak relationships (as relates to some criteria) between some deduction-promotion category pairs continue to be observed over time, the deduction category in the pair may be trimmed or removed from the grid. In this manner, the size of one or more of the grids 408, 410, 412, 414, may be further reduced to include and analyze only the stronger deduction-promotion category pairs. This enables controlling memory usage and processor speed for more efficiency in processing.

There may be additional optimizations that can be performed on the deduction data and performance data to minimize the number of columns or rows in a particular grid 408, 410, 412, 414 so that the functions in the grid run faster and the resulting rules are not diluted. For example, where the deductions data has more categories than the promotions data, it is possible that some of the deductions categories are blank (e.g., null). For instance, a buyer may not be maintaining any data in those categories. Accordingly, the categories with no data may be removed from one or more of the grids 408, 410, 412, 414 to reduce the size of the grid for further controlling memory usage and processor speed for more efficiency in processing. In another example, some categories of the deductions data may contain a same value or data all the time (e.g., a univariate), such as a one, indicating a lack of useful information in that category for applying the machine learning model. These categories that reflect no useful information may likewise be removed from one or more of the grids 408, 410, 412, 414 to reduce the size of the grid for further controlling memory usage and processor speed for more efficiency in processing. In another example, some categories of the deduction data may be repeated. These categories that reflect repeat or duplicated data may likewise be removed from one or more of the grids 408, 410, 412, 414 to reduce the size of the grid for further controlling memory usage and processor speed for more efficiency in processing.

Figure 6:
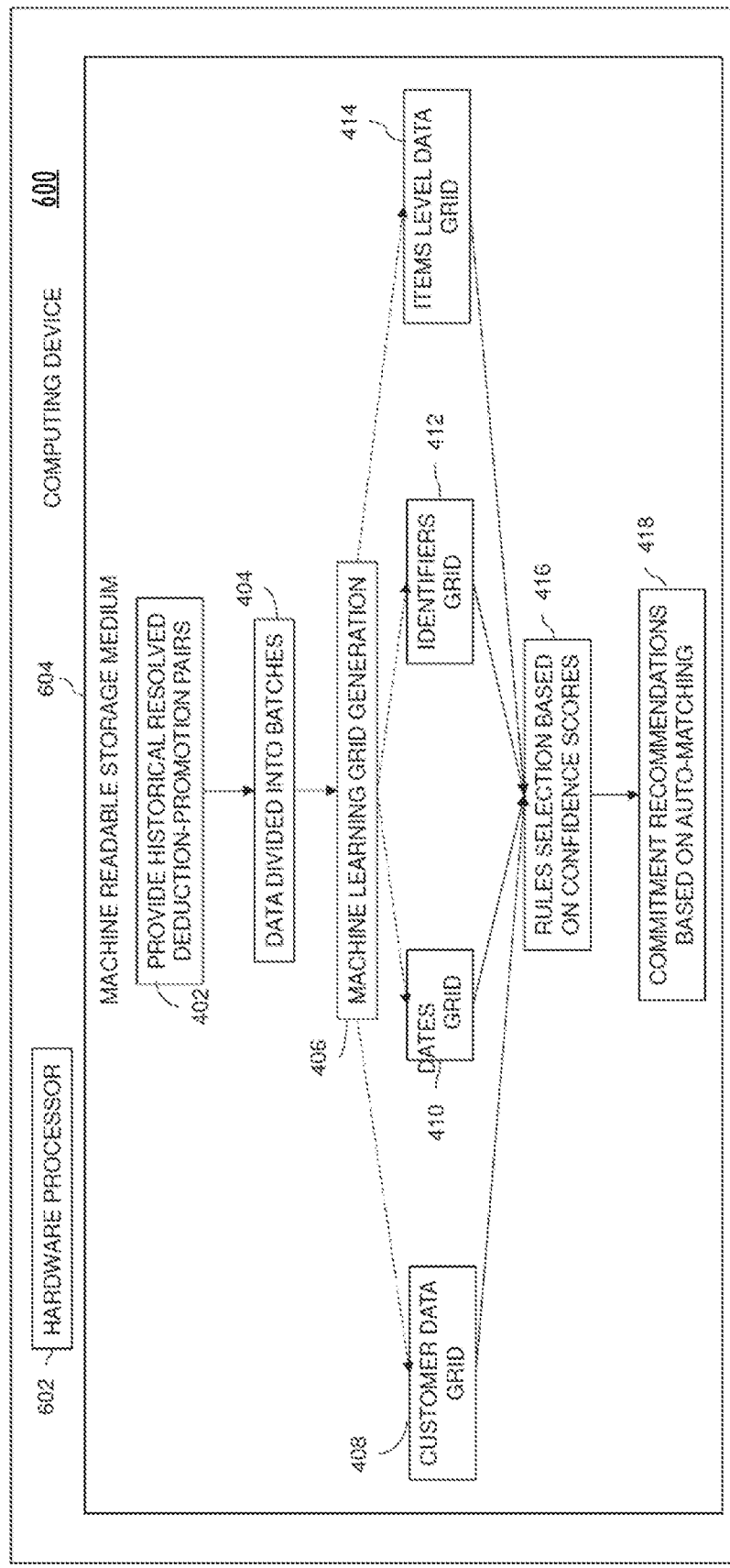
FIG. 6 is an example computing device with a hardware processor and accessible machine-readable instructions that may be used to compile and execute the example method of FIG. 4, according to one or more disclosed implementations.

Referring now to FIG. 6, shown is an example computing device 600, with a hardware processor 602, and accessible machine-readable instructions stored on a machine-readable medium 604 that may be used to execute the example method 400, according to one or more disclosed example implementations. However, computing device 600 may also be configured to perform the flow of other methods, techniques, functions, or processes described in this disclosure. In this example of FIG. 6, machine-readable storage medium 604 includes instructions to cause hardware processor 602 to perform blocks 402-418 discussed above with reference to FIG. 4.

A machine-readable storage medium, such as 604 of FIG. 6, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 7:
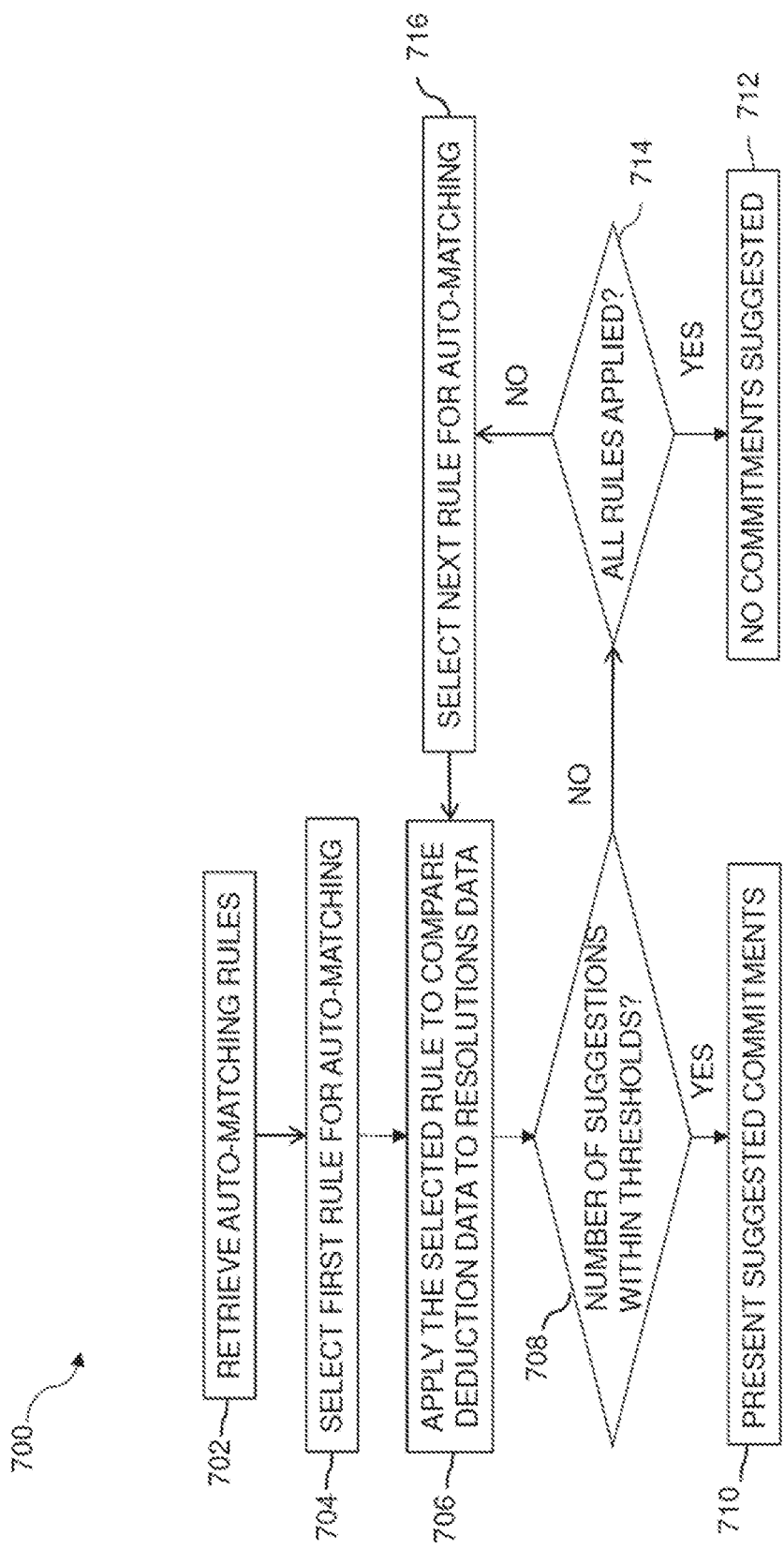
FIG. 7 is a process flow diagram illustrating an example method for trade deduction settlement using the trade deduction settlement rules selected by implementing the example method illustrated in FIG. 4, according to one or more disclosed implementations.

Referring now to FIG. 7, shown is a process flow diagram illustrating an example method 700 for trade deduction settlement using the rules selected by implementing the example method 400 illustrated in FIG. 4, according to one or more disclosed implementations. In one example, commitment recommendations in block 420 of FIG. 4 may be provided using the example method 700.

At block 702, of the example method 700, auto-matching rules are retrieved. For example one or more of the trade deduction settlement rules auto-generated using method 100B of FIG. 1B or method 400 of FIG. 4 may be retrieved (702). A first auto-matching rule may be selected (704). The selected auto-matching rule may be applied (706) to deduction-promotion pairs, for instance one at a time, to determine whether there are one or more matches. A match may be presented as a suggested commitment. In a particular example, a deduction matches a commitment when all the relationships of the selected auto-matching rule are satisfied, and that match may be presented as a suggested commitment.

A decision (708) may be made as to whether the number of suggested commitments is within one or more thresholds. If the number of suggested commitments falls outside of the one or more thresholds (the NO branch), the example method 700 proceeds to decision 714. Alternatively, if the number of suggested commitments is within the one or more thresholds (the YES branch), the suggested commitments may be presented (710), for instance to a deductions analyst. In one example, the thresholds operate to keep the suggested commitments within a specified number for review by the deductions analyst. For instance, if the number of suggested commitments exceeds a maximum threshold, this may indicate that a selected auto-matching rule is too generic, and the example method 700 may proceed to the decision 714. Alternatively, if no suggested commitments result from applying (706) the auto-matching rule, again the example method 700 may proceed to the decision 714.

At block 710, the suggested commitments may be presented to a deductions analyst for final resolution and/or reviewing or approving automatic matches. For example, one or more deductions may be automatically resolved. In another example, one or more proposed commitments may be suggested for resolving the one or more deductions, to be further researched by the deductions analyst.

At decision 714, a determination is made whether all the auto-matching rules have been applied. If all of the auto-matching rules have been applied (the YES branch), at block 712, no commitments are suggested. At this point, the deductions analyst may proceed with manually comparing one or more trade deduction settlement rules to the one or more deductions. Alternatively, if some of the auto-matching rules have not been applied (the NO branch), a next auto-matching rule is selected (716). The example method 700 then returns to block 706 where the selected rule is applied to deduction-promotion pairs to determine whether there are one or more matches.

Figure 8:
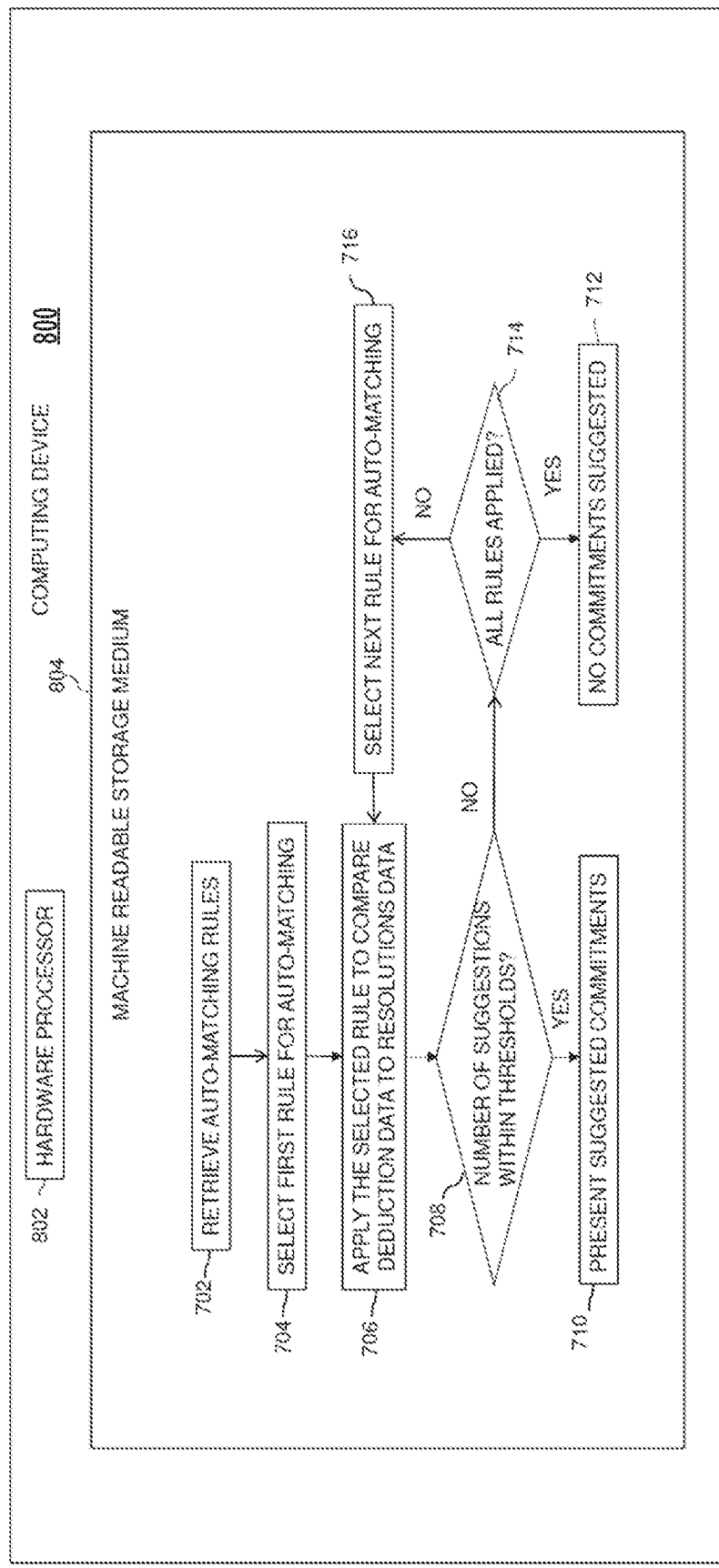
FIG. 8 is an example computing device with a hardware processor and accessible machine-readable instructions that may be used to compile and execute the example method of FIG. 7, according to one or more disclosed implementations.

Referring now to FIG. 8, shown is an example computing device 800, with a hardware processor 802, and accessible machine-readable instructions stored on a machine-readable medium 804 that may be used to execute the example method 700, according to one or more disclosed example implementations. However, computing device 800 may also be configured to perform the flow of other methods, techniques, functions, or processes described in this disclosure. In this example of FIG. 8, machine-readable storage medium 804 includes instructions to cause hardware processor 802 to perform blocks 702-712 discussed above with reference to FIG. 7.

A machine-readable storage medium, such as 804 of FIG. 8, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 9:
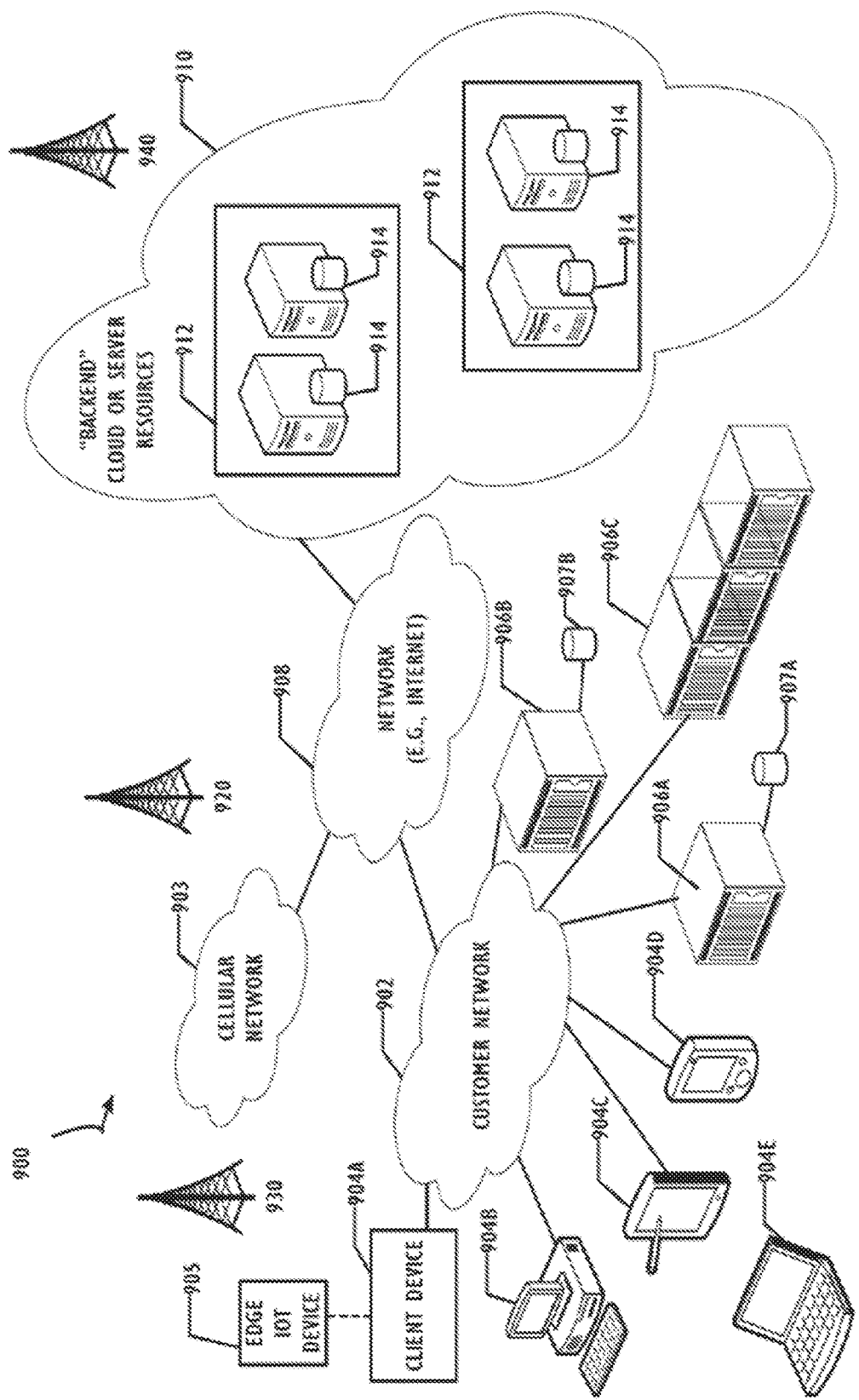
FIG. 9 represents a computer network infrastructure that may be used to implement all or part of the disclosed example methods, according to one or more disclosed implementations.

Referring now to FIG. 9, represented is a computer network infrastructure that may be used to implement all or part of the disclosed order hold prevention and held order release prediction techniques, according to one or more disclosed implementations. Network infrastructure 900 includes a set of networks where embodiments of the present disclosure may operate. Network infrastructure 900 comprises a customer network 902, network 908, cellular network 903, and a cloud service provider network 910. In one embodiment, the customer network 902 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®). In another embodiment, customer network 902 represents an enterprise network that could include or be communicatively coupled to one or more local area networks (LANs), virtual networks, data centers and/or other remote networks (e.g., 908, 910). In the context of the present disclosure, customer network 902 may include multiple devices configured with software that executes the disclosed order hold prevention and held order release prediction algorithms such as those described above. Also, one of the many computer storage resources in customer network 902 (or other networks shown) may be configured to store any customer or order data utilized by any algorithm described in the disclosed examples.

As shown in FIG. 9, customer network 902 may be connected to one or more client devices 904A-E and allow the client devices 904A-E to communicate with each other and/or with cloud service provider network 910, via network 908 (e.g., Internet). Client devices 904A-E may be computing systems such as desktop computer 904B, tablet computer 904C, mobile phone 904D, laptop computer (shown as wireless) 904E, and/or other types of computing systems generically shown as client device 904A.

Network infrastructure 900 may also include other types of devices generally referred to as Internet of Things (IoT) (e.g., edge IOT device 905) that may be configured to send and receive information via a network to access cloud computing services or interact with a remote web browser application (e.g., to receive configuration information).

FIG. 9 also illustrates that customer network 902 includes local compute resources 906A-C that may include a server, access point, router, or other device configured to provide for local computational resources and/or facilitate communication amongst networks and devices. For example, local compute resources 906A-C may be one or more physical local hardware devices, such as the different configurations of NN processing systems outlined above. Local compute resources 906A-C may also facilitate communication between other external applications, data sources (e.g., 907A and 907B), and services, and customer network 902. Local compute resource 906C illustrates a possible processing system cluster with three nodes. Of course, any number of nodes is possible, but three are shown in this example for illustrative purposes.

Network infrastructure 900 also includes cellular network 903 for use with mobile communication devices. Mobile cellular networks support mobile phones and many other types of mobile devices such as laptops etc. Mobile devices in network infrastructure 900 are illustrated as mobile phone 904D, laptop computer 904E, and tablet computer 904C. A mobile device such as mobile phone 904D may interact with one or more mobile provider networks as the mobile device moves, typically interacting with a plurality of mobile network towers 920, 930, and 940 for connecting to the cellular network 903. In the context of the current disclosed order hold prediction and held order release prediction algorithms, operations to access and process data may be facilitated by systems communicating through network infrastructure 900.

Although referred to as a cellular network in FIG. 9, a mobile device may interact with towers of more than one provider network, as well as with multiple non-cellular devices such as wireless access points and routers (e.g., local compute resources 906A-C). In addition, the mobile devices may interact with other mobile devices or with non-mobile devices such as desktop computer 904B and various types of client device 904A for desired services. Although not specifically illustrated in FIG. 9, customer network 902 may also include a dedicated network device (e.g., gateway or router) or a combination of network devices (not shown) that implement a customer firewall or intrusion protection system. These types of devices may be configured to provide an interface to an event management processing and throttling system of this disclosure.

FIG. 9 illustrates that customer network 902 is coupled to a network 908. Network 908 may include one or more computing networks available today, such as other LANs, wide area networks (WAN), the Internet, and/or other remote networks, in order to transfer data between client devices 904A-D and cloud service provider network 910. Each of the computing networks within network 908 may contain wired and/or wireless programmable devices that operate in the electrical and/or optical domain.

In FIG. 9, cloud service provider network 910 is illustrated as a remote network (e.g., a cloud network) that is able to communicate with client devices 904A-E via customer network 902 and network 908. The cloud service provider network 910 acts as a platform that provides additional computing resources to the client devices 904A-E and/or customer network 902. In one embodiment, cloud service provider network 910 includes one or more data centers 912 with one or more server instances 914.

Figure 10:
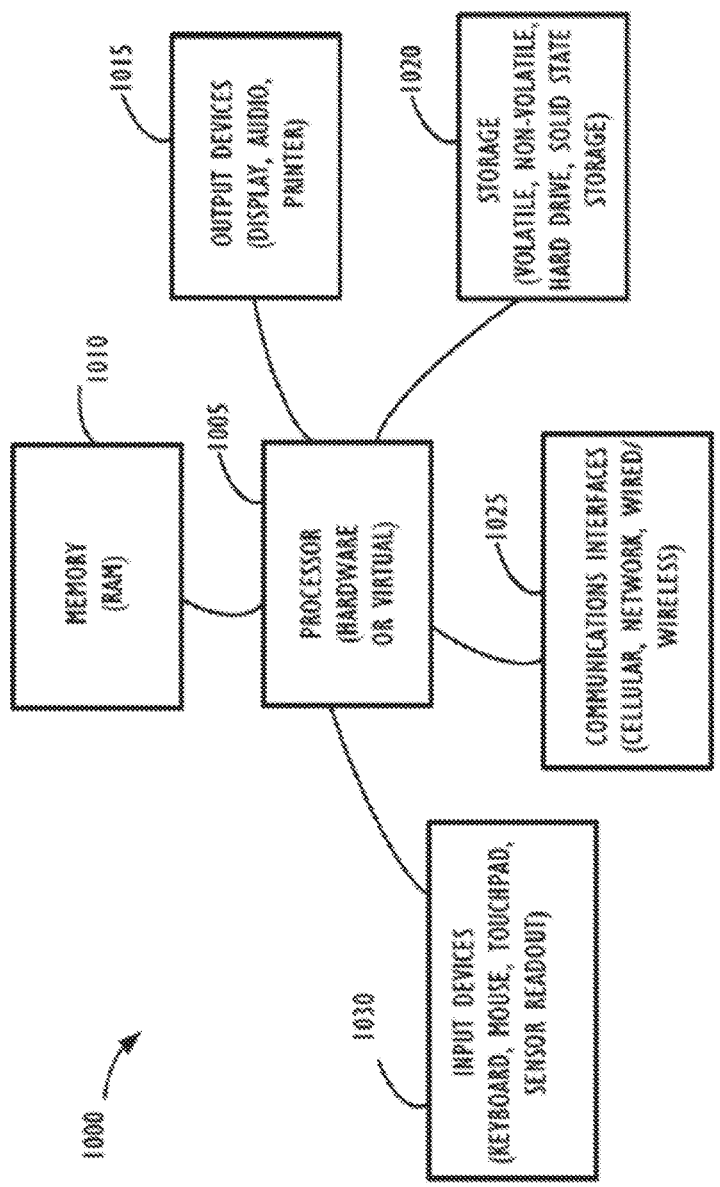
FIG. 10 illustrates a computer processing device that may be used to implement the functions, modules, processing platforms, execution platforms, communication devices, and other methods and processes of this disclosure.

Referring now to FIG. 10, shown is a computer processing device 1000 that may be used to implement the functions, modules, processing platforms, execution platforms, communication devices, and other methods and processes of this disclosure. For example, computing device 1000 illustrated in FIG. 10 could represent a client device or a physical server device and include either hardware or virtual processor(s) depending on the level of abstraction of the computing device. In some instances (without abstraction), computing device 1000 and its elements, as shown in FIG. 10, each relate to physical hardware. Alternatively, in some instances one, more, or all of the elements could be implemented using emulators or virtual machines as levels of abstraction. In any case, no matter how many levels of abstraction away from the physical hardware, computing device 1000 at its lowest level may be implemented on physical hardware.

As also shown in FIG. 10, computing device 1000 may include one or more input devices 1030, such as a keyboard, mouse, touchpad, or sensor readout (e.g., biometric scanner) and one or more output devices 1015, such as displays, speakers for audio, or printers. Some devices may be configured as input/output devices also (e.g., a network interface or touchscreen display).

Computing device 1000 may also include communications interfaces 1025, such as a network communication unit that could include a wired communication component and/or a wireless communications component, which may be communicatively coupled to processor 1005. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 10, computing device 1000 includes a processing element such as processor 1005 that contains one or more hardware processors, where each hardware processor may have a single or multiple processor cores. In one embodiment, the processor 1005 may include at least one shared cache that stores data (e.g., computing instructions) that are utilized by one or more other components of processor 1005. For example, the shared cache may be a locally cached data stored in a memory for faster access by components of the processing elements that make up processor 1005. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 10, the processing elements that make up processor 1005 may also include one or more of other types of hardware processing components, such as graphics processing units (GPU), application specific integrated circuits (ASICs), field-programmable gate arrays (FPGAs), and/or digital signal processors (DSPs).

FIG. 10 illustrates that memory 1010 may be operatively and communicatively coupled to processor 1005. Memory 1010 may be a non-transitory medium configured to store various types of data. For example, memory 1010 may include one or more storage devices 1020 that comprise a non-volatile storage device and/or volatile memory. Volatile memory, such as random-access memory (RAM), can be any suitable non-permanent storage device. The non-volatile storage devices 1020 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 1020 may be used to store overflow data if allocated RAM is not large enough to hold all working data. The non-volatile storage devices 1020 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 1005. In one embodiment, the compiling process of the software program may transform program code written in a programming language to another computer language such that the processor 1005 is able to execute the programming code. For example, the compiling process of the software program may generate an executable program that provides encoded instructions (e.g., machine code instructions) for processor 1005 to accomplish specific, non-generic, particular computing functions.

After the compiling process, the encoded instructions may then be loaded as computer executable instructions or process steps to processor 1005 from storage device 1020, from memory 1010, and/or embedded within processor 1005 (e.g., via a cache or on-board ROM). Processor 1005 may be configured to execute the stored instructions or process steps in order to perform instructions or process steps to transform the computing device into a non-generic, particular, specially programmed machine or apparatus. Stored data, e.g., data stored by a storage device 1020, may be accessed by processor 1005 during the execution of computer executable instructions or process steps to instruct one or more components within the computing device 1000.

A user interface (e.g., output devices 1015 and input devices 1030) can include a display, positional input device (such as a mouse, touchpad, touchscreen, or the like), keyboard, or other forms of user input and output devices. The user interface components may be communicatively coupled to processor 1005. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 1000 may comprise other components well known in the art, such as sensors, powers sources, and/or analog-to-digital converters, not explicitly shown in FIG. 10.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer-implemented method comprising:
retrieving, with a processor of a computing system, a first plurality of historical resolved transaction component pairs each having a corresponding first transaction component and a matching second transaction component, wherein the matching second transaction component aligns the corresponding first transaction component with the matching second transaction component as a resolved pair for an already completed transaction within a computerized accounting system;
generating, with the processor of the computing system, a machine learning model based on the first plurality of historical resolved transaction component pairs, wherein generating the machine learning model comprises:
for each historical resolved transaction component pair:
generating a set of grids based on one or more grid categories, wherein the set of grids comprises at least two grids, and wherein each grid of the at least two grids is associated with a different category from the one or more grid categories;
populating each grid of the set of grids using first values from the corresponding first transaction component associated with a corresponding category of such grid and second values from the matching second transaction component associated with the corresponding category of such grid, wherein each grid comprises a plurality of cells, with each cell comprising a plurality of functions, wherein populating each grid of the set of grids comprises assigning a different value pair to each cell of each grid, each value pair comprising one first value from the corresponding first transaction component and one second value from the matching second transaction component;
iteratively applying each of the plurality of functions for each cell to generate grid results for individual cells: and
for each function application at each cell:
increasing a weightage for a function of the cell responsive to satisfaction of the function: and
decreasing the weightage for the function of the cell responsive to unsatisfaction of the function;
detecting, by the processor of the computing system and from the grid results, one or more patterns based on a distribution of weightages of the functions of the cells of the set of grids to generate the machine learning model, and
based on the generation by the processor of the machine learning model, deriving, with the processor of the computing system using the machine learning model generated from the detected one or more patterns, a first set of transaction settlement rules to resolve at least one new unresolved transaction component; and
resolving, with the processor of the computing system using the first set of transaction settlement rules, the at least one new unresolved transaction component, wherein each of the at least one new unresolved transaction component is resolved into a corresponding new resolved transaction component pair having a new first transaction component and a new matching second transaction component.

2. The computer-implemented method of claim 1, wherein populating the set of grids comprises populating a plurality of grids, and wherein, the first values from the corresponding first transaction component correspond to one or more first categories of a first transaction component database, the second values from the matching second transaction component correspond to one or more second categories of a second transaction component database, and each value pair corresponds to a different category pair comprising one category of the first transaction component database and one category of the second transaction component database, the computer-implemented method further comprising:
   assigning the categories of the first transaction component database and the categories of the second transaction component database across the plurality of grids to the one or more grid categories to increase a likelihood of corresponding value pairs satisfying one of the plurality of functions.

3. The computer-implemented method of claim 2 further comprising reducing an amount of the one or more first categories and the one or more second categories and corresponding values assigned across the plurality of grids to reduce a size of one or more of the plurality of grids, the reducing the amount comprising one or more of:
   reducing the amount of the one or more first categories of the first transaction component database assigned across the plurality of grids based upon a total number of one or more first categories of the first transaction component database exceeding a total number of one or more second categories of the second transaction component database;
   excluding a first category from being assigned to one of the plurality of grids based upon the corresponding values of the category repeating over a plurality of value pairs;
   excluding each duplicate category from being assigned across the plurality of grids; and
   excluding a second category based on detecting, over time, a relationship between the corresponding value pairs being below a threshold, wherein the relationship being below the threshold is detected based on a criterion.

4. The computer-implemented method of claim 1, further comprising:
   dividing the first plurality of historical resolved transaction component pairs into a first plurality of batches of historical resolved transaction component pairs, each batch comprising a different portion of the first plurality of historical resolved transaction component pairs; and
   applying the machine learning model to each batch to generate corresponding grid results.

5. The computer-implemented method of claim 4, further comprising:
   calculating a weighted average across the grid results for each batch of the first plurality of batches; and
   detecting the one or more patterns from the weighted average across the grid results for deriving the first set of transaction settlement rules.

6. The computer-implemented method of claim 5, further comprising:
   dividing the first plurality of historical resolved transaction component pairs into the first plurality of batches based on age associated with the historical resolved transaction component pairs;
   assigning a higher weight to grid results derived from newer historical resolved transaction component pairs, to calculate the weighted average; and
   assigning a lower weight to grid results derived from older historical resolved transaction component pairs, to calculate the weighted average.

7. The computer-implemented method of claim 6, further comprising:
   retrieving a second plurality of historical resolved transaction component pairs comprising a first portion of the first plurality of historical resolved transaction component pairs associated with a first age range and excluding a second portion of the first plurality of historical resolved transaction component pairs associated with a second age range that is older than the first age range, the second plurality of historical resolved transaction component pairs further comprising historical resolved transaction component pairs having a third age range that is newer than the first age range;
   dividing the second plurality of historical resolved transaction component pairs into a second plurality of batches of historical resolved transaction component pairs based on the age associated with the corresponding historical resolved transaction component pairs;
   applying the machine learning model to each batch of the second plurality of batches to generate corresponding grid results;
   calculating a running weighted average across the grid results for each batch of the second plurality of batches, wherein a higher weight is assigned to grid results derived from newer historical resolved transaction component pairs, and a lower weight is assigned to grid results derived from older historical resolved transaction component pairs;
   detecting one or more patterns from the running weighted average across the grid results; and
   deriving a second set of transaction settlement rules based on the one or more patterns detected from the running weighted average.

8. The computer-implemented method of claim 7, wherein the second set of transaction settlement rules contains some of the transaction settlement rules from the first set of transaction settlement rules and excludes at least one transaction settlement rule of the transaction settlement rules from the first set of transaction settlement rules.

9. The computer-implemented method of claim 7, wherein the second set of transaction settlement rules contains some of the transaction settlement rules from the first set of transaction settlement rules and includes at least one transaction settlement rule that is absent from the first set of transaction settlement rules.

10. The computer-implemented method of claim 7, wherein the first plurality of historical resolved transaction component pairs and the second plurality of historical resolved transaction component pairs cover an equivalent amount of time duration.

11. The computer-implemented method of claim 1, wherein iteratively applying each of the plurality of functions for each cell comprises:
   randomly selecting a first initial function to apply for a first subset of the first plurality of historical resolved transaction component pairs; and
   selecting a function associated with a highest weightage, as determined from processing the first plurality of historical resolved transaction component pairs, as a second initial function to apply for a second subset of the first plurality of historical resolved transaction component pairs.

12. The computer-implemented method of claim 1, wherein each of the historical resolved transaction component pairs provide information reflecting a deduction, as the corresponding first transaction component, the deduction comprising deduction values, and a matching promotion, as the second matching transaction component, the promotion comprising promotion values.

13. A non-transitory computer-readable storage medium including executable instructions that, when executed by a processor, cause the processor to:
retrieve a first plurality of historical resolved transaction component pairs each having a corresponding first transaction component and a matching second transaction component, wherein the matching second transaction component aligns the corresponding first transaction component with the matching second transaction component as a resolved pair for an already completed transaction within a computerized accounting system;
generate a machine learning model based on the first plurality of historical resolved transaction component pairs, wherein generating the machine learning model comprises:
for each historical resolved transaction component pair:
generating a set of grids based on one or more grid categories, wherein the set of grids comprises at least two grids, and wherein each grid of the at least two grids is associated with a different category from the one or more grid categories,
populating each grid of the set of grids using first values from the corresponding first transaction component associated with a corresponding category of such grid and second values from the matching second transaction component associated with the corresponding category of such grid, wherein each grid comprises a plurality of cells, with each cell comprising a plurality of functions, wherein populating each grid of the set of grids comprises assigning a different value pair to each cell of each grid, each value pair comprising one first value from the corresponding first transaction component and one second value from the matching second transaction component;
iteratively apply each of the plurality of functions for each cell to generate grid results for individual cells: and
for each function application at each cell:
increase a weightage for a function of the cell responsive to satisfaction of the function: and
decrease the weightage for the function of the cell responsive to unsatisfaction of the function;
detecting, from the grid results, one or more patterns based on a distribution of weightages of the functions of the cells of the set of grids to generate the machine learning model; and
based on the generation by the processor of the machine learning model, derive, using the machine learning model generated from the detected one or more patterns, a first set of transaction settlement rules to resolve at least one new unresolved transaction component; and
resolve, using the machine learning model, the at least one new unresolved transaction component, wherein each of the at least one new unresolved transaction component is resolved into a corresponding new resolved transaction component pair having a new first transaction component and a new matching second transaction component.

14. The non-transitory computer-readable storage medium of claim 13, wherein populating the set of grids comprises populating a plurality of grids, and wherein the first values from the corresponding first transaction component correspond to one or more first categories of a first transaction component database, the second values from the matching second transaction component correspond to one or more second categories of a second transaction component database, and each value pair corresponds to a different category pair comprising one category of the first transaction component database and one category of the second transaction component database, wherein the executable instructions, when executed by the processor, cause the processor to:
assign the categories of the first transaction component database and the categories of the second transaction component database across the plurality of grids according to the one or more grid categories to increase a likelihood of corresponding value pairs satisfying one of the plurality of functions.

15. The non-transitory computer-readable storage medium of claim 13, wherein the executable instructions, when executed by the processor, cause the processor to:
divide the first plurality of historical resolved transaction component pairs into a first plurality of batches of historical resolved transaction component pairs, each batch comprising a different portion of the first plurality of historical resolved transaction component pairs;
apply the machine learning model to each batch to generate corresponding grid results;
calculate a weighted average across the grid results for each batch of the first plurality of batches; and
detect the one or more patterns from the weighted average across the grid results for deriving the first set of transaction rules.

16. The non-transitory computer-readable storage medium of claim 15, wherein the executable instructions, when executed by the processor, cause the processor to:
retrieve a second plurality of historical resolved transaction component pairs comprising a first portion of the first plurality of historical resolved transaction component pairs associated with a first age range and excluding a second portion of the first plurality of historical resolved transaction component pairs associated with a second age range that is older than the first age range, the second plurality of historical resolved transaction component pairs further comprising historical resolved transaction component pairs having a third age range that is newer than the first age range;
divide the second plurality of historical resolved transaction component pairs into a second plurality of batches of historical resolved transaction component pairs based on the age associated with the corresponding historical resolved transaction component pairs;
apply the machine learning model to each batch of the second plurality of batches to generate corresponding grid results;
calculate a running weighted average across the grid results for each batch of the second plurality of batches, wherein a higher weight is assigned to grid results derived from newer historical resolved transaction component pairs, and a lower weight is assigned to grid results derived from older historical resolved transaction component pairs;

detect one or more patterns from the running weighted average across the grid results; and
derive a second set of transaction settlement rules based on the one or more patterns detected from the running weighted average.

17. The non-transitory computer-readable storage medium of claim 16, wherein the second set of transaction settlement rules contains some of the transaction settlement rules from the first set of transaction settlement rules, wherein the executable instructions, when executed by the processor, cause the processor to:
exclude at least one transaction settlement rule of the transaction settlement rules from the first set of transaction settlement rules.

18. The non-transitory computer-readable storage medium of claim 16, wherein the second set of transaction settlement rules contains some of the transaction settlement rules from the first set of transaction settlement rules, wherein the executable instructions, when executed by the processor, cause the processor to:
include at least one transaction settlement rule that is absent from the first set of transaction settlement rules.

19. A computing device comprising:
a processor;
a non-transitory computer-readable storage medium including executable instructions that, when executed by a processor, cause the processor to:
retrieve a first plurality of historical resolved transaction component pairs each having a corresponding first transaction component and a matching second transaction component, wherein the matching second transaction component aligns the corresponding first transaction component with the matching second transaction component as a resolved transaction component pair for an already completed transaction within a computerized accounting system;
generate a machine learning model based the first plurality of historical resolved transaction component pairs, wherein the machine learning model comprises:
for each historical resolved transaction component pair:
generating a set of grids based on one or more grid categories, wherein the set of grids comprises at least two grids, and wherein each grid of the at least two grids is associated with a different category from the one or more categories;
populating each grid of the set of grids using first values from the corresponding first transaction component associated with a corresponding category of such grid and using second values from the matching second transaction component associated with the corresponding category of such grid, wherein each grid comprises a plurality of cells, with each cell comprising a plurality of functions, wherein populating each grid of the set of grids comprises assigning a different value pair to each cell of each grid, each value pair comprising one first value from the corresponding first transaction component and one second value from the matching second transaction component;
iteratively apply each of the plurality of functions for each cell to generate grid results for individual cells: and
for each function application at each cell:
increase a weightage for a function of the cell responsive to satisfaction of the function: and
decrease the weightage for the function of the cell responsive to unsatisfaction of the function;
detecting, from the grid results, one or more patterns based on a distribution of weightages of the functions of the cells of the set of grids to generate the machine learning model; and
based on the generation by the processor of the machine learning model, derive, using the machine learning model generated from the detected one or more patterns, a first set of transaction settlement rules to resolve at least one new unresolved transaction component; and
resolve, using the machine learning model, the at least one new unresolved transaction component, wherein each of the at least one new unresolved transaction component is resolved into a corresponding new resolved transaction component pair having a new first transaction component and a new matching second transaction component.

20. The computing device of claim 19, wherein the executable instructions, when executed by the processor, cause the processor to:
divide the first plurality of historical resolved transaction component pairs into a first plurality of batches of historical resolved transaction component pairs, each batch comprising a different portion of the first plurality of historical resolved transaction component pairs;
apply the machine learning model to each batch to generate corresponding grid results;
calculate a weighted average across the grid results for each batch of the first plurality of batches;
detect the one or more patterns from the weighted average across the grid results for deriving the first set of transaction settlement rules;
retrieve a second plurality of historical resolved transaction component pairs comprising a first portion of the first plurality of historical resolved transaction component pairs associated with a first age range and excluding a second portion of the first plurality of historical resolved transaction component pairs associated with a second age range that is older than the first age range, the second plurality of historical resolved transaction component pairs further comprising historical resolved transaction component pairs having a third age range that is newer than the first age range;
divide the second plurality of historical resolved transaction component pairs into a second plurality of batches of historical resolved transaction component pairs based on the age associated with the corresponding historical resolved transaction component pairs;
apply the machine learning model to each batch of the second plurality of batches to generate corresponding grid results;
calculate a running weighted average across the grid results for each batch of the second plurality of batches, wherein a higher weight is assigned to grid results derived from newer historical resolved transaction component pairs, and a lower weight is assigned to grid results derived from older historical resolved transaction component pairs;
detect one or more patterns from the running weighted average across the grid results; and derive a second set of transaction rules based on the one or more patterns detected from the running weighted average.

* * * * *